Patented Aug. 26, 1947

2,426,220

UNITED STATES PATENT OFFICE 2,426,220

BITUMINOUS COMPOSITION HAVING INCREASED ADHESION TO MINERAL AGGREGATE

James M. Johnson, New York, N. Y., assignor to Nostrip Inc., a corporation of Delaware No Drawing. Application September 2, 1942, Serial No. 457,099

5 Claims. (Cl. 106—123)

This invention relates to a bitumen treating composition and the method of making it, and particularly to a composition that when dispersed in asphalt or like thermoplastic bituminous material gives a product that may be coated over any wet aggregate so as to give a continuous coating and strong bond with the aggregate.

There has been extensive work in this field and a large number of compositions have been described for mixing with wet aggregate in the making of pavement or other bituminous products. A number of the compositions described make use of asphalt intimately mixed with water insoluble soaps of which the zinc, aluminum, and calcium soaps are typical.

It has now been discovered that bituminous compositions that pass standard tests for paving materials may be made by mixing with the thermoplastic bituminous material the product of the reaction of certain amines with an acid. Such coated and bonded materials, with all types of wet aggregate have been found to pass the Nicholson stripping test and also immersion in water for one hour in the distilled water test. When such reaction product is used, its dispersion or solution in the bituminous material gives a coating and bonding material that may be used with all types of wet aggregate with uniformly satisfactory results.

The invention comprises the treating composition and the method of making it including the reaction product of the selected acid with a surface active amine. The invention comprises also the coating and bonding mixture made by dispersing this composition in thermoplastic bituminous material. In the preferred embodiment, the invention comprises bitumen treating compositions including the reaction product of such an amine with a higher fatty acid and a dispersion of them in thermoplastic bituminous materials, the term dispersion being used herein to include both colloidal dispersion and solution in the usual sense.

As the aggregate to be coated and bonded, there may be used any kind, as, for example, broken stone, slag, or sand, in either dry or wet condition.

As the thermoplastic bituminous material, there is used a natural asphalt, petroleum still residues, or heavy tars, all being very stiff plastics at ordinary temperatures but softenable to flowable liquids when warmed to a temperature of about 300° F. or so.

A particularly satisfactory amine for the present purpose is one made by warming a higher fatty acid and preferably oleic or ricinoleic acid with an equimolecular proportion of an alkylene polyamine, of which polyamine suitable examples are ethylene diamine and propylene diamine. These products are warmed during manufacture to the temperature at which the amine salts first formed are known to decompose, with the liberation of water and the production of amido-amines of which the oleyl amido-amines are examples. This latter material is known commercially by the name Nopco C. V. T. The class of compounds of which this is an example may be described as acyl amido-amines, the acyl group being that of a higher fatty acid. Such products made from the polyamines contain at least one unreacted $NH_2$ group and are therefore reactive when treated with additional acid as in the process of making the present treating composition.

The acid used is preferably a higher fatty acid or a commercial mixture of them such as talloil, red oil (crude oleic acid), cottonseed oil fatty acids, or the like, talloil which is known to include a large proportion of resin acids giving especially satisfactory properties.

The proportion of the amine used is subject to considerable variations. Proportions of about 5 to 20 parts and suitably 10 to 15 parts of the amine to 100 parts of the fatty acid are desirable.

The selected amine and the fatty acid are mixed together in anhydrous condition and are warmed to a temperature sufficiently elevated to make the mixture fluid, as to about 150 to 200° F., until there is formed a homogeneous mass which shows no signs of reaction. A few minutes warming is sufficient.

The amido-amine made initially may be represented by the type formula $R.CO.NH.R''.NH_2$. In this formula $R.CO$ is the residue (acyl group) of a higher fatty acid after the loss of the hydroxyl group. $R''$ is a bivalent group consisting principally of carbon and hydrogen, the group being joined on each side through carbon to nitrogens. When ethylene diamine is the amine used initially this $R''$ is $CH_2.CH_2$. When propylene diamine has been used initially, then $R''$ becomes $CH_2.CH_2.CH_2$.

When the acyl amido-amine of the type referred to above is reacted with a higher fatty acid, then there is produced an acyl amido-amine soap of the type formula $R.CO.NH.R''.NH_3.OOC.R'$. In this formula $OOC.R'$ is the residue (here the acid radical) of a higher fatty acid after loss of the hydrogen of the hydroxyl group, frequently referred to as the acid hydrogen.

The type formula may be illustrated by oleyl amido-amine oleate, referred to above. When derived from ethylene diamine, the formula is C$_{17}$H$_{33}$.CO.NH.CH$_2$.CH$_2$.NH$_3$.OOC.C$_{17}$H$_{33}$.

After the amine has been reacted with the fatty acid, to give a product that is largely the amine salt of the selected acid but may contain appreciable amide, the reaction product is incorporated into the thermoplastic bituminous composition, as a treating composition for the said thermoplastic material, to adapt it to give with any kind of wet aggregate the continuous and strong bond that is an object of the invention.

In making the complete coating and bonding composition, the amine and acid reaction product is incorporated into the thermoplastic material advantageously in the proportion of approximately 0.5 to 3 and preferably about 0.5 to 1.5 parts of the treating composition to 100 parts of the thermoplastic bituminous material. Large proportions of the treating composition may be used but are not required.

The incorporation of the treating composition is made to advantage at the temperature at which the thermoplastic bituminous material is to be applied to the aggregate. Thus the admixture may be made at a temperature of about 250 to 350° F., the temperature required being higher the greater the viscosity of the bituminous material to be treated. The salts of the higher fatty acids with the surface active amines are soluble in asphalt and like thermoplastic bituminous material.

A specific example of the making of a very satisfactory composition follows. The surface active amine referred to above by the name Nopco C. V. T. is mixed with talloil in the proportion of 16 parts of the former to 84 of the latter. The mixture is made intimate by stirring at a temperature of approximately 180° F., at which point the materials are liquids of low viscosity.

After this mixture is made homogeneous, it is then incorporated into cut-back asphalt in the proportion of approximately 0.5 part to 100 parts of the asphalt. Aggregate is then mixed with this treated bituminous material in any conventional manner or machine and at a temperature ordinarily used for mixing asphalt in solvent-cut condition with the aggregate.

The aggregate so coated is discharged from the pug mill directly into a conventional spreader and finishing unit and applied as pavement in a usual manner.

In a modification of the invention, the combination of the amine with the fatty acid is applied to the aggregate which is later to be mixed with the asphalt or like bituminous paving composition. Thus 20 parts of Nopco C. V. T. is reacted with 80 parts of talloil. The product is then dissolved with a volatile organic solvent, such as naphtha, benzol, or toluol, say in the proportion of 5 to 15 parts of solvent by weight to 1 part of the said product.

The solvent diluted material so made is then applied in small proportions to the aggregate, say in the proportion of about 0.3 to 1% by weight of the aggregate, the aggregate being preferably tumbled during the addition so as to coat all the aggregate.

When aggregate so treated is incorporated into the bituminous material, the coating on the aggregate becomes blended with the bituminous material at the zones of contact with the aggregate at the places where the effect of the amine compound is most needed.

Compositions made as described with fatty acids reacted with the amines are particularly suitable for use with cut back asphalts, that is, with asphalt or petroleum and tar still residues that have been cut by the incorporation of a usual proportion of naphtha, kerosene, or the like. Under some conditions, there may be used to advantage a modification of the invention in which the reaction product of the amine with the acid is associated with water.

In making such treating compositions with aqueous acid, there may be used any one of the amines listed above or any one meeting the stated requirements as to the general properties of the amines. The acid selected is preferably commercial hydrochloric acid containing somewhat more than one-third by weight of actual hydrogen chloride, the rest being water. Additional water is added to the commercial acid before the amine is introduced and the resulting mixture warmed to a temperature below the boiling point, say to 200° F., so that the amine will be flowable at the temperature of mixing. The amine such as Nopco C. V. T. is then introduced in the proportion of about 10 to 20 parts for 10 parts of the commercial acid containing sufficient additional water to make 50 to 150 parts of total weight. After being stirred for a few minutes the mixture becomes homogeneous and is then ready for dispersion by emulsification in asphalt.

The asphalt to be used with this relatively diluted composition may be in uncut condition.

The asphalt and treating material are warmed so that the asphalt becomes relatively fluid, and the treating material and asphalt thoroughly mixed to form a composition which is then used with an aggregate in any manner or machine that is usual in mixing uncut asphalt with aggregate for paving, roofing, or like uses. Thus the mixture is made and subsequently spread on a roadway at temperatures of about 275° to 350° F.

The proportion of amine to acid used in making the reaction products may be determined by hydrolyzing the reaction products and separating the thus liberated amine from the remaining compound of the acid, all in accordance with the understood behavior and reactions of amine salts.

In one embodiment of the invention, I carry the reaction of the amine and the higher fatty acid only to the stage where some of the acid remains free in the resulting surface active product. Thus I may use an excess of talloil or other various higher fatty acids over the amount required to combine with the amine or moderate the heating, so that the finished product contains say about 10 to 60% of the total acid in free condition.

Certain subject matter herein disclosed but not claimed is claimed in my copending application Serial No. 460,175, filed September 29, 1942, entitled Aggregate treating composition.

It will be understood also that it is intended to cover all changes and modifications of the example of the invention herein chosen for the purpose of illustration which do not constitute departures from the spirit and scope of the invention.

What is claimed is:

1. An acyl amidoamine soap of the general formula R.CO.HN.R''.NH$_3$.OOC.R' in which R.CO and R'.COO represent residues of higher fatty acids after the loss of OH and acid hydrogen, respectively, and N.R''.N is an alkylene polyamine residue representing the polyamine less the hydrogen atoms normally associated with each N shown in the formula.

2. An improved bituminous bonding material comprising a flowable bituminous composition and the soap described in claim 1, the soap being in the proportion of 0.5 to 3 parts for 100 of the bituminous material.

3. A paving composition comprising asphalt and an oleyl amido-amine oleate, the oleate being dissolved in the asphalt and causing the composition to have the property of bonding durably to all types of wet paving aggregate when mixed therewith.

4. An improved bituminous bonding material comprising asphalt and an acylamidoamine soap of a higher fatty acid, the fatty acid represented in the acyl group being also a higher fatty acid.

5. An improved bituminous bonding material comprising asphalt and an acyl amidoamine soap, the acid represented in the acyl group and also in the soap radical being the organic acids derived from talloil.

JAMES M. JOHNSON.

REFERENCES CITED

The following references are of record in the file of this patent:

UNITED STATES PATENTS

| Number | Name | Date |
|---|---|---|
| 2,191,295 | Dohse et al. | Feb. 20, 1940 |
| 2,328,551 | Gunderson | Sept. 7, 1943 |
| 2,225,189 | Wayne | Dec. 17, 1940 |
| 2,094,609 | Kritchevsky | Oct. 5, 1937 |
| 2,357,917 | Stull | Sept. 12, 1944 |
| 1,969,904 | Sadtler | Apr. 14, 1934 |
| 1,674,523 | Sadtler | June 19, 1928 |
| 1,947,951 | Neelmeier et al. | Feb. 20, 1934 |

FOREIGN PATENTS

| Number | Country | Date |
|---|---|---|
| 429,548 | Great Britain | May 31, 1935 |
| 847,829 | France | July 10, 1939 |
| 543,625 | Great Britain | Mar. 5, 1942 |
| 457,810 | Great Britain | Dec. 7, 1936 |